United States Patent [19]

Ohta

[11] Patent Number: 4,855,540
[45] Date of Patent: Aug. 8, 1989

[54] SWITCH

[75] Inventor: Takashi Ohta, Aichi, Japan

[73] Assignee: Kabushiki Kaisha Tokai Rika Denki Seisakusho, Aichi, Japan

[21] Appl. No.: 244,372

[22] Filed: Sep. 14, 1988

[30] Foreign Application Priority Data

Sep. 17, 1987 [JP] Japan ............................. 62-141839[U]

[51] Int. Cl.$^4$ ........................ H01H 9/26; H01H 13/72
[52] U.S. Cl. .................................................... 200/5 E
[58] Field of Search ................... 200/5 R, 5 E, 5 EA, 200/5 EB, 50 C, 5 B

[56] References Cited

U.S. PATENT DOCUMENTS 3,249,705  5/1966  Amis, Jr. et al. ................... 200/5 E
3,732,476  5/1973  Cairelli ............................ 200/5 E X
3,780,236  12/1973  Gross .............................. 200/5 E X
3,796,844  3/1974  Osika ................................ 200/5 E
4,720,608  1/1988  Mizuta ............................ 200/5 E X Primary Examiner—J. R. Scott
Attorney, Agent, or Firm—Finnegan, Henderson, Farabow, Garrett, & Dunner

[57] ABSTRACT

A switch with three movable contact holders, correspondingly manipulatable operating members, and return members movable perpendicular to the contact holders, contact holders having projections for engaging with the surface of V-shaped notches in the return members which prevent simultaneous operation of more than one contact holder, and cause a contact holder to be restored to neutral position upon operation of another contact holder to a neutral position.

10 Claims, 4 Drawing Sheets

SWITCH

BACKGROUND OF THE INVENTION

1. Field of the Invention

The present invention relates to a switch having a plurality of contact holders of the type wherein one contact holder is moved from a working position to an original or neutral position upon the movement of another contact holder to a working position, and wherein more than one contact holder is prevented from being placed simultaneously in a working position.

2. Description of the Prior Art

On conventional switch of such kind includes three contact holders juxtaposed in the casing of the switch, and corresponding returners or return members and stoppers or stopping members. The contact holder of the switch is moved from a neutral position to a working position by the pushing of an operator member. The return member returns the other contact holders to a neutral position when one of the contact holders is moved to a working position; and the stopper cooperates with the return member to prevent more than one contact holder from simultaneously being placed in a working position. Since the return members and stoppers are individually provided in the conventional switch, the switch tends to have a large number of components and requires a high dimensional accuracy of the component, making it difficult to manufacture the switch.

SUMMARY OF THE INVENTION

One of the objects of the present invention is to provide a switch that overcomes the problems and disadvantages of the prior art.

The object of the present invention is to provide a switch, which has a fewer number of components and requires a less demanding dimensional accuracy than the conventional switch thus making it easier to manufacture.

To achieve this object and in accordance with the purpose of the inveniton as embodied and broadly desribed herein, the switch comprises a plurality of contact holders, juxtaposed in the casing of the switch, which are moved from an original or neutral position to a working position and vice-versa by manipulation of operating members; projections provided on the surface of the contact holders; and return members provided between the projections, which are moved perpendicularly to the direction of movement of the contact holders. When one of the contact holders is moved from a neutral position to a working position while another contact holder is held in a working position, the return member is automatically pushed by the action of the projection of the contact holder being moved to return the contact holder held in a working position to a neutral position. The return member, acting also as a stopper, prevents the contact holders from simultaneously being placed in a working position.

Since the stopper is fully incorporated into the return member of the switch according to the present invention and thus no additional components are required to perform the stopper function, the total number of components in the switch is substantially reduced and a high dimensional accuracy of the components is no longer required, thus making it easier to manufacture the switch.

The accompanying drawings, which are incorporated in and constitutes a part of this specification, illustrates one embodiment of the invention and together with the description serve to explain the principles of the invention.

DETAILED DESCRIPTION OF THE PREFERRED EMBODIMENT

Reference will now be made in detail to the present preferred embodiment of the invention, an example of which is illustrated in the accompanying drawings.

Figure 1:
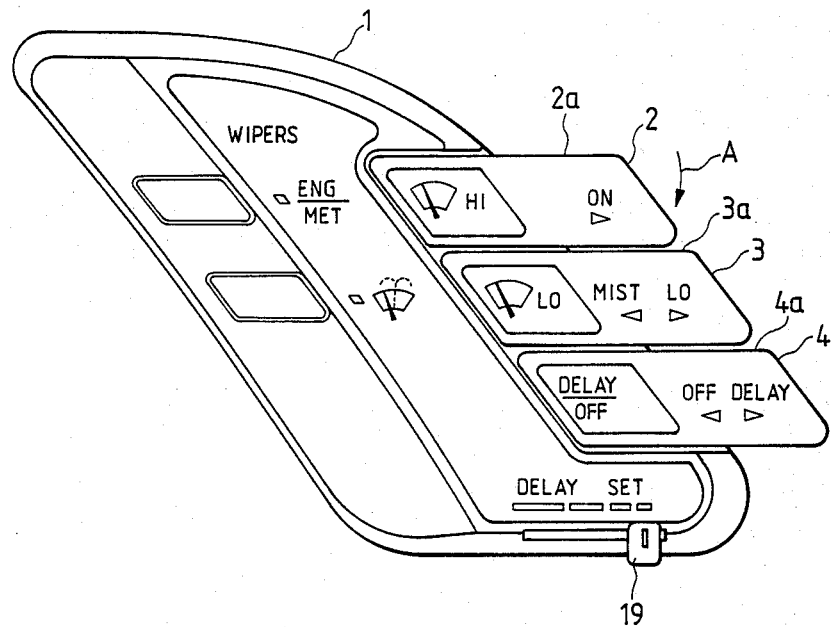
FIG. 1 shows a perspective view of the switch for an windshield wiper of a motor vehicle, according to one embodiment of the present invention.
Figure 2:
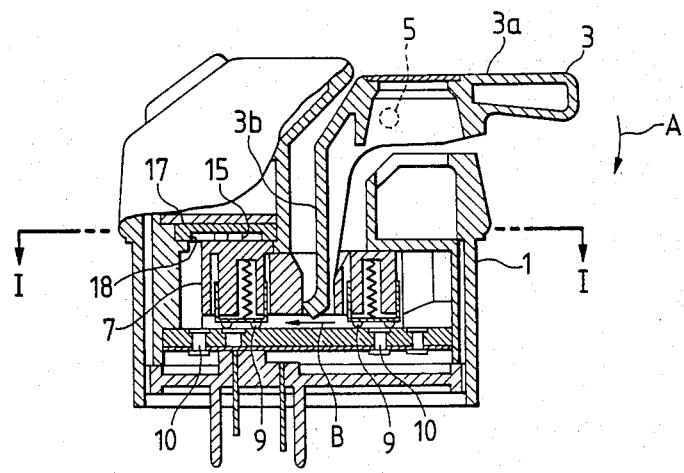
FIG. 2 shows a cross-sectional view of the switch.
Figure 3:
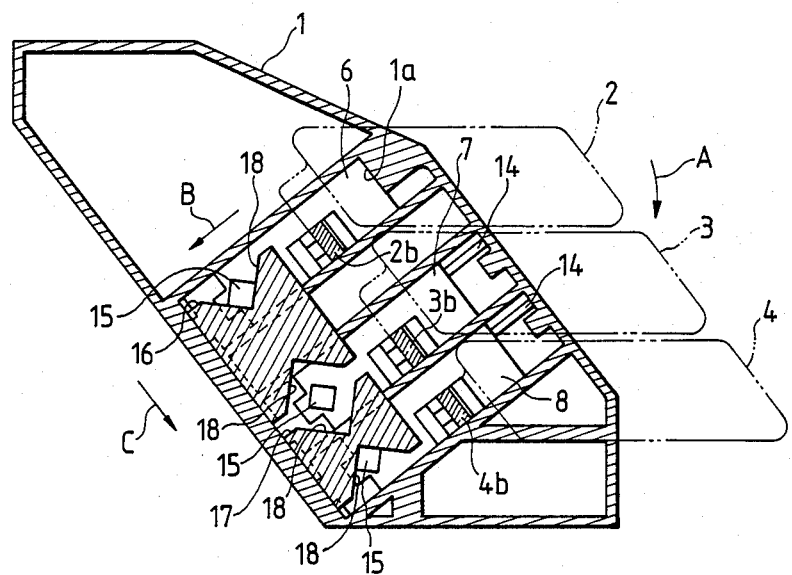
FIG. 3 shows a longitudinal sectional view of the switch along the line I—I shown in FIG. 2.

FIG. 1 shows a switch for a windshield wiper of a motor vehicle according to one embodiment of the present invention. As shown in FIG. 3, the switch includes a casing 1, and first, second and third L-shape, operating members 2, 3 and 4, for control of the windshield wiper operation. Operating members 2, 3 and 4 are juxtaposed in casing 1. Sides 2a, 3a and 4a of respective operating members 2, 3 and 4, are projected sideward from casing 1. Sides 2b, 3b and 4b of operating members 2, 3 and 4, respectively are projected vertically and perpendicular to sides 2a, 3a and 4a, into casing 1 as shown in a two-dot rectangular chain line in FIG. 3. Operating members 2, 3 and 4 are manipulated to pivot on shafts 5 when pushed downward in a prescribed direction A as shown in FIG. 2 or in reverse direction. A knob 19 provided on the periphery of casing 1 regulates the time interval of the intermittent operation of the windshield wiper.

In FIG. 3, first, second and third contact holders 6, 7 and 8 of respective operating members 2, 3 and 4 are embedded juxta-positionally in casing 1. Sides 2b, 3b and 4b of respective operating members 2, 3 and 4 are engaged with the intermediate portion of respective contact holders 6, 7 and 8 to move corresponding contact holders 6, 7 and 8 in a prescribed direction B or in a reverse direction when the operating members are manipulated.

In FIG. 2, movable contacts 9 are provided on both right and left portions of second contact holder 7 and only on left portion of first and third contact holders 6 and 8. Fixed contacts 10 are provided in casing 1 to engage movable contacts 9 in or out of contact with corresponding fixed contacts.

Figure 4:
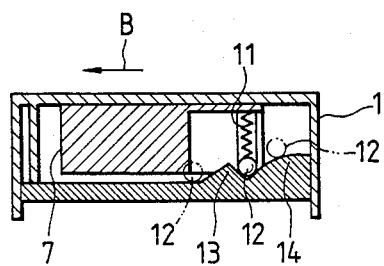
FIG. 4 shows a cross-sectional view of a contact holder area of the switch.

In FIG. 4, a pusher 12 having a compressed helical spring 11 urging the pusher held in contact with casing 1 is provided for contact holders 6, 7 and 8. Casing 1 is provided with first protuberance 13 and second protuberance 14. Only first protuberance 13 is provided for pusher 12 of first contact holder 6, and both first and second protuberances 13 and 14 are provided for pusher 12 for each of second and third contact holders 7 and 8. When pusher 12 of second contact holder 7 is placed between first and second protuberances 13 and 14, as shown by a solid circle in FIG. 4, second contact holder 7 is held or retained in a neutral position. When second contact holder 7 is moved in a prescribed direction B, pusher 12 is displaced over first protuberance 13, as shown by a two-dot circular chain line in FIG. 4 and second contact holder 7 is moved to a first working position.

When second operating member 3 is manipulated in a direction reverse to a prescribed direction A shown in FIG. 2 while second contact holder 7 is in a neutral position, second contact holder 7 is moved in a direction reverse to direction B as shown in FIG. 4; pusher 12 is displaced onto second protuberance 14, as shown by a two-dot circular chain line in FIG. 4; and consequently second contact holder 17 is moved to a second working position. When second operating member 3 is released, pusher 12 of second contact holder 7 slides automatically from second protuberance 14 and returns to a neutral position. Third contact holder 8 operates similarly to the operation of second contact holder 7 when third operating member 4 is similarly manipulated.

When first operating member 2 is manipulated in direction A while corresponding first contact holder 6 is in a neutral position, first contact holder 6 is moved in direction B to a working position. However, a stop portion 1a of first contact holder 6, disposed in casing 1 as shown in FIG. 3, blocks first contact holder 6 from being moved from a neutral position to another position in a direction reverse to direction B and consequently prevents first operating member 2 from being manipulated in a direction reverse to direction A.

In FIG. 3, projections 15, of a rectangular or similar shape, are provided on the surface of contact holders 6, 7 and 8. A first return member 16, of a first irregular shape, is provided between projections 15 of first and second contact holders 6 and 7. A second return member 17, of a similar shape is provided between projections 15 of second and third contact holders 7 and 8. Return members 16 and 17 have V-shaped notches 18, corresponding to projections 15 of contact holders 6, 7 and 8 and are moved in a direction C, perpendicular to the movement of contact holders or in a reverse direction.

Figure 5:
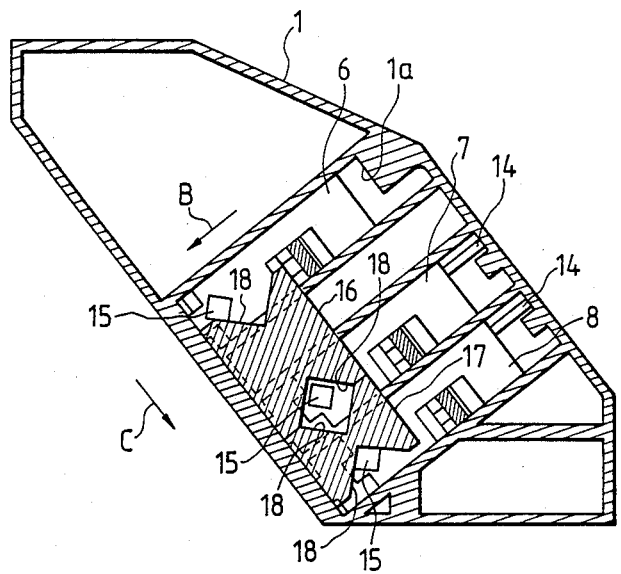
FIG. 5 shows a longitudinal sectional view of the switch of FIG. 1 with the first contact holder in a working position.

The operation of the switch according to the present invention is described in detail hereinafter. In FIG. 5, when only first operating member 2 is manipulated in direction A shown in FIG. 2, first contact holder 6 is moved in direction B, from an original position to a working position. While projection 15 of first contact holder 6 pushes first return member 16 in direction C so that first contact holder 6 is held in a working position. As a result, the windshield wiper is rapidly run. In this situation, first return member 16 makes a contact with second return member 17.

Figure 6:
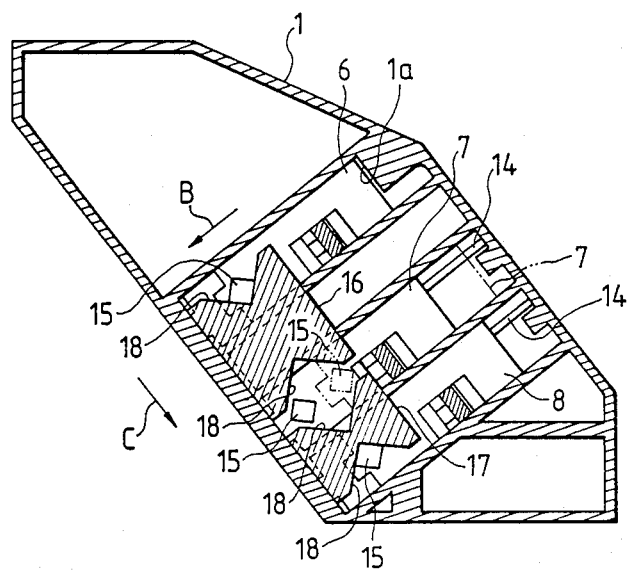
FIG. 6 shows a longitudinal section view of the switch of FIG. 1 with the second contact holder in a working position.

In FIG. 6, when only second operating member 3 is manipulated in direction A, second contact holder 7 is moved in direction B from a neutral position to first working position. As a result, the windshield wiper is slowly run. When second operating member 3 is subsequently manipulated in a direction reverse to direction A, second contact holder 7 is moved to second working position, as shown by a two-dot square chain line in FIG. 6. When second operating member 3 is released, second contact holder 7 is automatically returned to a neutral position.

Figure 7:
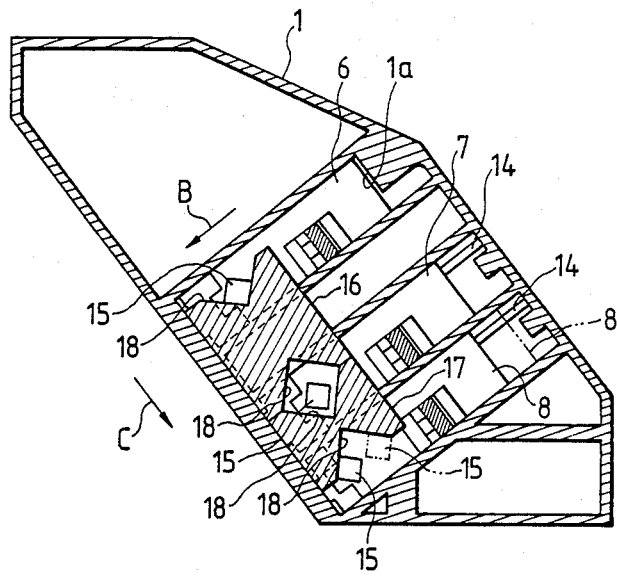
FIG. 7 shows a longitudinal sectional view of the switch of FIG. 1 with the third contact holder in a working position.

In FIG. 7, when only third operating member 4 is manipulated in direction A, third contact holder 8 is moved in direction B, from a neutral position to first working position while projecting 15 of third contact holder 8 pushes second return member 17 in a direction reverse to direction C so that third contact holder 8 is held in first working position. As a result, the windshield wiper is intermittently run. When third operating member 4 is subsequently manipulated in a direction reverse to direction A, thrid contact holder 8 is moved to second working position, as shown by a two-dot square chain line in FIG. 7. While projection 15 of third contact holder 8 pushes second return member 17 in a direction reverse to direction C. When third operating member 4 is released, third contact holder 8 is automatically returned to a neutral position. In this situation, second return member 17 is moved in a direction reverse to direction C, to make contact with first return member 16.

When third operating member 4 is manipulated in a direction reverse to a direction A while first contact holder 6 is in a working position as shown in FIG. 5, third contact holder 8 is moved in a direction reverse to direction B while projection 15 of third contact holder 8 pushes second return member 17 which in turn pushes first return member 16 in a direction reverse to direction C, so that first contact holder is moved in a direction reverse to direction B and consequently first contact holder 6 is returned to a neutral position.

When third operating member 4 is manipulated in a direction reverse to direction A while second contact holder 7 is in first working position third contact holder 8 is moved in a direction reverse to the direction B while projection 15 of third contact holder 8 pushes second return member 17 in a direction reverse to direction C which in turn pushes projection 15 of second contact holder 7 so that second contact holder is moved in a direction reverse to the direction B and consequently second contact holder 7 is returned to a neutral position.

Figure 8:
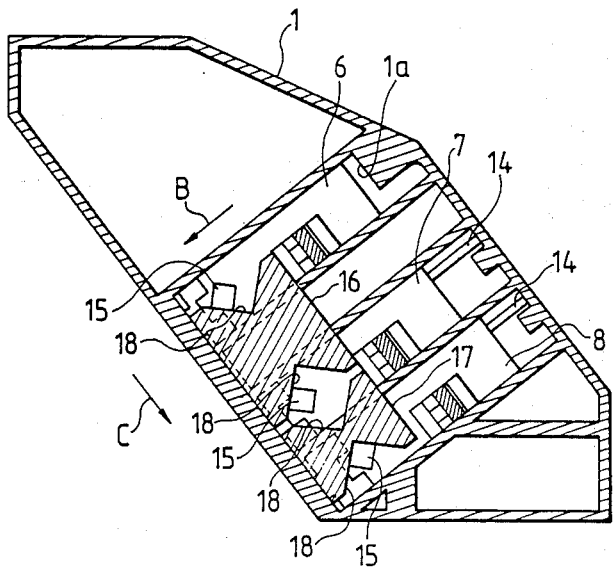
FIG. 8 shows a longitudinal sectional view of the switch of FIG. 1 illustrating the position of the switch component when the first and second members of the operating members are simulataneously manipulated in a prescribed direction.

When first and second operating members 2 and 3 are simultaneously manipulated in direction A, first and second contact holders 6 and 7 are moved in direction B but projections 15 of first and second contact holders 6 and 7 are stopped by first return member 16 for further movement as shown in FIG. 8. Thus first and second contact holders 6 and 7 are prevented from being moved further in direction B and consequently first and second contact holders are prevented from being placed in a working position simultaneously.

Similarly, when second and third operating members 3 and 4 are simultaneously manipulated in direction A second return member 17 prevents second and third contact holders 7 and 8 from being simultaneously placed in a working position. Since second and third operating members 3 and 4 can be manipulated either in direction A thereto or in a reverse direction, the number of the operation modes of the switch can be larger than that of a conventional switch.

It will be apparent to those skilled in the art that various modifications and variations can be made in the switch of the present invention and in construction of this switch without departing from the scope or spirit of the invention. As an example, although the number of the operating members and the number of the corresponding contact holders in the aforesaid embodiment of the present invention is three, the present invention, is not limited to this number and the number, for example, can be two.

What is claimed is:

1. A switch comprising:

a casing;

a plurality of fixed contacts fixedly mounted in said casing;

a plurality of juxtaposed contact holders mounted in said casing movable in opposite first directions either to a neutral position or at least one working position, each contact holder having an electrical contact movable therewith disengaged from a respective one of the plurality of fixed contacts at times when said each contact holder is in the neutral position and engaged with a respective one of the plurality of fixed contacts at times when said each contact holder is in the art least one working position; a projection having an engaging surface extending in a second direction substantially perpendicular to the opposite first directions;

an operating member for each contact holder mounted to said casing for moving each respective contact holder either to the neutral or working position; and a plurality of juxtaposed return members mounted in said casing movable in opposite third directions substantially perpendicular to the opposite first directions and the second direction, each return member having at least one engaging surface opposing said engaging surface of the projection for engaging the opposing engaging surface of the projection to move a corresponding contact holder of hte plurality of contact holders between the neutral and at least one working positions in one direction in response to movement of another contact holder of the plurality of contact holders between the neutral and working positions in the other direction.

2. The switch according to claim 1, wherein said projections and return members are disposed to block movement of said corresponding and another contact holders to the at least one working position in response to simultaneous manipulation of respective operating members thereof.

3. A switch according to claim 1, wherein said at least one engaging surface of the return member includes two engaging surfaces converging at an angle forming a V-shaped notch.

4. A switch according to claim 1, wherein said casing includes irregular internal surfaces each having at least one protuberance for each contact holder, and each contact holder includes a pusher portion for riding on the irregular surface upon movement of said each contact holder, said protuberance being configured to retain said each contact holder in the at least one working position upon manipulation of a corresponding operating member in one direction.

5. A switch according to claim 4, wherein the pusher portion includes a rotatable member in engagement with the irregular surfaces.

6. A switch according to claim 3, wherein each return member includes two engaging surfaces on opposite sides thereof, said engaging surfaces being disposed for engaging the respective projections of adjacent contact holders simultaneously to limit movement of the adjacent contact holders toward the at least one working position.

7. A switch according to claim 3, wherein said engaging surface of each projection includes two engaging surfaces substantially parallel to respective ones of said two engaging surfaces of the return members.

8. A switch according to claim 1, wherein said operating members are manipulated around an axis disposed substantially perpendicular to the opposite first directions.

9. A switch according to claim 4, wherein said at least one working position of at least one of the plurality of contact holders includes two working positions and said protuberance is configured to retain said at least one contact holder in one of the two working positions upon manipulation of a corresponding operating member in one direction and to urge said at least one contact holder to the neutral position upon release of the corresponding operating member from the manipulation thereof in the other direction.

10. A switch according to claim 6, wherein said casing includes irregular internal surfaces each having protuberance for each contact holder, and each contact holder includes a pusher portion for rinding on the irregular surface upon movement of said each contact holder, said protuberance being configured to retain said each contact holder in the at least one working position upon manipulation of a corresponding operating member in one direction and the at least one working position of at least one of the plurality of contact holders includes two working positions and said protuberance is configured to retain said at least one contact holder in one of the two working positions upon manipulation of a corresponding operating member in one direction and to urge said at least one contact holder to the neutral position upon release of the corresponding operating member from the manipulation thereof in the other direction.

* * * * *